United States Patent Office 3,041,208
Patented June 26, 1962

3,041,208
COATING POLYOLEFIN FILM AND COATING METHOD
Peter M. Hay, Hamden, Conn., George R. Mitchell, Cleveland, Ohio, and Peter P. Salatiello, Morristown, N.J., assignors to Olin Mathieson Chemical Corporation, a corporation of Virginia
No Drawing. Filed Feb. 19, 1959, Ser. No. 794,251
8 Claims. (Cl. 117—138.8)

This invention relates to a polymeric coating composition and more particularly to a moistureproof, heat sealable, polymeric coating for extensible film such as polyethylene film, polypropylene film, and the like, as well as to the method of coating and the coated article formed.

The development of polymer base films such as films of polyethylene, polypropylene and the like has resulted in potential packaging material having various characteristics, some desirable and some undesirable. For example, polyethylene film has desirable moisture proof qualities per se while its extensibility makes the film highly durable. It is also highly permeable to some gases but this latter characteristic is of such a high degree that in many respects, it is undesirable. The film is also unsuitable for the packaging of grease containing substances and is cloudy in appearance. Because of the extensibility of the base polyethylene sheet, an unusual problem in the modification of the film arises. Although many polymeric and other coating compositions are known, as for example, that shown in U.S. 2,570,478, their use upon extensible polymeric film such as polyethylene and the like results only in a coating which flakes off, peels off or spalls when the film is stretched in its use. Obviously, such flaking, peeling or spalling is undesirable, not only in appearance but also in its effect upon the film as a packaging material.

Not all polyethylene has identical characteristics either with regard to physical properties and appearance or to the susceptibility of the surface to be treated or to retain surface coatings. Similarly, the characteristics of polymers other than polyethylene, such as polypropylene and the like, to receive and retain strongly adherent extensible surface films is not the same for each such film, nor for all samples of one of these films.

One object is to improve the degree of adhesion of surface coatings on a wide variety of film types and film samples.

Another object of this invention is to provide a novel coating composition for extensible polymeric film. A further object of this invention is to modify extensible polymeric film such as polyethylene, polypropylene and the like in order to impart desirable characteristics thereto typical of a superior wrapping material. A still further object of this invention is to provide a moistureproof and greaseproof coating for an extensible polymeric film, in particular polyethylene film. Another object of this invention is to increase the heat seal strength of extensible polymeric film by providing it with a coating which produces such a result. And another object of this invention is to provide a coating for extensible polymeric films, particularly those having characteristics similar to polyethylene, which increases its clarity. And still another object is to provide a coating which has a maximum of film slip (ability to slide over surfaces) and minimum of film blocking (ability to prevent self-adherence of separate sheets) problems. A further object of this invention is to provide a coated extensible polymeric film, in particular polyethylene, having an anchored coating thereon, which is ink retentive. A still further object is to provide a coating on a polymeric base sheet having a higher degree of adhesion than heretofore possible. Other objects will become apparent to those skilled in the art upon reading the detailed disclosure that follows hereinafter.

The above objects are accomplished generally speaking, by coating extensible polymeric film, such as treated polyethylene and the like, with an extensible polymeric coating composition containing an acrylic or methacrylic acid as its anchoring agent. Preferably, the objects of this invention are accomplished by coating the extensible polymeric film, such as treated polyethylene, polypropylene and the like, with a polymeric coating composition of vinylidene chloride, an acrylic or methacrylic acid and an ester of an organic acid having a vinyl grouping in its alcohol or acid chain, the grouping having 3 to 20 carbon atoms.

A typical illustration of a coating composition, its preparation and application to an extensible polymeric film, in particular, treated polyethylene, is more clearly and in greater detail presented in the examples that follow:

EXAMPLE I

A coating composition is prepared by the emulsion polymerization technique by taking

| | Parts (by weight) |
|---|---|
| Vinylidene chloride | 83 |
| Methacrylic acid | 2.0 |
| n Butyl acrylate | 15 |
| "Aerosol MA" [1] | .625 |
| Water | 101 |
| Ammonium persulfate | 0.29 |
| Sodium metabisulfite | 0.15 |

[1] Sodium dihexyl sulfosuccinate—80% in water manufactured by American Cyanamid Company, Stamford, Connecticut.

and charging each to a stainless steel reactor capable of withstanding at least 50 p.s.i. pressure. The contents are heated to 55° C. while being agitated and agitation is continued at this temperature for three and a half hours at which time the polymerization reaction is complete. Twelve parts of "Duponol WAQ" (sodium lauryl sulfate—30% in water manufactured by E. I. du Pont de Nemours of Wilmington, Delaware) are then added to the batch to aid in preserving the emulsion. The resulting dispersion is then filtered through a polyamide fiber cloth filter to remove unduly large particles that may have formed and is then fed to an immersion type coating apparatus. In the polymerization charge "Aerosol MA" may be replaced by "Duponol WAQ" or "Pendit WA." The major ingredient of the replacement ingredients is sodium lauryl sulfate. The relative proportions in which any of these, or similar ingredients are used, may be changed to change the properties of the composition or of the resulting film.

Polyethylene film of one and one-half mil thickness, which has been pretreated to promote adhesion of coating thereon, is then passed through the immersion coating apparatus at a rate of 35 ft./min.

The treatment employed in the examples herein is the glow discharge treatment such as that referred to above. Treatment at voltages higher than 22,000 volts can be employed.

The degree of treatment of base polymer film has been tested heretofore by applying an appropriate ink, drying the ink on the film and then attempting to remove it by applying and then removing adhesive tape to and from the imprinted surface.

It has been discovered that this test was inadequate when applied to the testing of treated films for their suitability for retention of coatings formed thereon in accordance with the teaching of the subject invention.

The ink retention test was inadequate in that it could not be used to distinguish between different degrees of treatment above a certain minimum value. A 100% ink retention was found for all levels of treatments above the minimum.

In accordance with the subject invention a determination of the suitability of a treated polymeric base sheet is made by applying a composition, capable of forming, on the treated film, an extensible polymeric surface layer containing acrylic or methacrylic acid. A composition such as that given above has been found satisfactory for this purpose. The actual testing of the degree of retention of such a coating may be made by heat sealing two samples of such film together using a slight pressure, and then determining the strength of such seal in a tensile tester. Values of heat seals as given herein are for samples sealed over a width of 1.5 inches.

Polyethylene film is pretreated by subjecting it to treatments such as the following:

(a) A flame treatment as disclosed in U.S. 2,632,921, U.S. 2,684,097 and U.S. 2,683,894.

(b) A solution treatment as described in U.S. 2,668,134.

(c) A glow discharge treatment, which is greatly preferred, as described in copending patent application Serial Number 359,352, filing date June 3, 1953, issued as U.S. 2,935,418 on May 3, 1960. This latter treatment involves passing the polyethylene transversely at a distance from the electrode of about .030 inch through a high-frequency (500–17,500 cycles per second), high voltage (3,000 to 22,000 volts), glow discharge zone having a discharge current between .0015–.128 ampere.

The coated film, after emerging from the coating tank, is passed through doctor bars or rolls to remove excess coating emulsion. The film is then dried at temperatures less than 90° C. and wound up on a storage roll.

The treated coated film when compared to treated film which is uncoated gives the following characteristics:

| Film | Coated | Uncoated |
| --- | --- | --- |
| Coating weight | 2 g. per sq. m | None. |
| Appearance: | | |
| Gloss | Glossy | Dull. |
| Transparency | Sl. hazy | Hazy. |
| Functional characteristics: | | |
| Heat seal strength—35% R.H. | 1,925 g | 200 g. |
| Adhesive seal strength | 650 g | 1150 g. |
| Ink retention | 100% | 100%. |
| Permeability: | | |
| Water vapor (TAPPI) | 11.8 | 11.6. |
| Oxygen | 540 | 6,700. |
| Odor (time to penetrate): | | |
| Distilled vinegar | Over 8 hours | 0.07 hour. |
| Glacial acetic acid | 0.13 hour | 0.03 hour. |
| Clove | 2 hours | 0.03 hour. |
| Vanilla extract | 6 hours | 0.07 hour. |
| Onion | Over 8 hours | 0.03 hour. |
| Mineral oil | Over 100 days | 2 days. |
| Physical characteristics: | | |
| Tensile to yield (TD) | 1,200 p.s.i | 1,400 p.s.i. |
| Tear strength (TD) | 425 g | 405 g. |
| Pendulum impact strength | 10.7 kg. cm | 11.0 kg. cm. |
| Flex life 35% R.H. | Over 20,000 | Over 20,000. |
| Stiffness T.D. (Clark) | 45 mm | 40 mm. |
| Coefficient of friction | 0.31 | 0.60. |

EXAMPLE II

A coating latex was prepared as in Example I, using the following formulation:

|  | Parts |
| --- | --- |
| Vinylidene chloride | 83 |
| 2-ethylhexyl acrylate | 15 |
| Methacrylic acid | 2.0 |
| "Duponol WAQ" | 7.08 |
| "Daxad 11"[1] | 1.06 |
| Water | 149 |
| Ammonium persulfate | 0.41 |
| Sodium metabisulfite | 0.21 |

[1] Sodium beta naphthalene sulfonate condensed with formaldehyde manufactured by Dewey and Almy Company, Cambridge, Massachusetts.

The finished batch was stabilized with 3.54 parts of "Duponol WAQ".

Treated polyethylene coated with this latex as compared to treated film gives the following characteristics:

| Film | Coated | Uncoated |
| --- | --- | --- |
| Coating weight | 2 g. per sq. m | None. |
| Appearance: | | |
| Gloss | Glossy | Dull. |
| Transparency | Sl. hazy | Hazy. |
| Functional characteristics: | | |
| Heat seal strength—35% R.H. | 1,575 g | 200 g. |
| Ink retention | 100% | 100%. |
| Physical characteristics: | | |
| Tensile to yield (TD) | 1,500 p.s.i | 1,400 p.s.i. |
| Tear strength (TD) | 538 g | 405 g. |
| Pendulum impact strength | 13.2 kg. cm | 11.0 kg. cm. |

EXAMPLE III

A coating latex was prepared as in Example I, using the following formulation:

|  | Parts |
| --- | --- |
| Vinylidene chloride | 83 |
| Vinyl 2-ethylhexanoate | 15 |
| Methacrylic acid | 2.0 |
| "Aerosol MA" | 1.25 |
| Water | 149 |
| Ammonium persulfate | 0.41 |
| Sodium metabisulfite | 0.21 |

The finished batch was stabilized with 6.0 parts of "Duponol WAQ."

Treated polyethylene coated with this latex as compared to uncoated treated film gives the following characteristics:

| Film | Coated | Uncoated |
| --- | --- | --- |
| Coating weight | 2 g. per sq. m | None. |
| Appearance: | | |
| Gloss | Glossy | Dull. |
| Transparency | Sl. hazy | Hazy. |
| Functional characteristics: | | |
| Heat seal strength—35% R.H. | 135 | 200 g. |
| Ink retention | 100% | 100%. |
| Physical characteristics: | | |
| Tensile to yield (TD) | 1,500 p.s.i | 1,400 p.s.i. |
| Tear strength (TD) | 475 g | 405 g. |
| Pendulum impact strength | 14.4 kg. cm | 11.0 kg. cm. |

Generally speaking, the coating composition of this invention comprises a tripolymer of (a) a monomer such as vinyldene chloride, (b) acrylic or methacrylic acid and (c) an ester of an organic acid capable of rendering the coating polymer extensible, and having a vinyl grouping either in its alcohol or acid chain, the other grouping being of at least a three carbon length. As used herein extensible means having a capability of being extended by more than 10% of its width and length as formed, without deleterious change in appearance and without rupture of the coating or separation of the coating from the base sheet.

In graphic structure, this (c) component of the polymer may be represented as:

$$CH_2=CH-COOR$$

or $$R-COO-CH=CH_2$$

where R is an alkyl group containing 4 to 20 carbon atoms.

The preferred esters are butyl acrylate, 2-ethylhexyl acrylate, vinyl stearate and vinyl 2-ethylhexanoate. The concentration of each component is preferably as follows:

|  | Parts (by weight) |
| --- | --- |
| (a) Vinylidene chloride | 80 to 95 |
| (b) Acrylic or methacrylic acid | 1 to 3 |
| (c) Ester | 5 to 20 |

Evidence indicates that a possible theory behind the operability of the coatings disclosed herein is probably due to the fact that the internal plasticizer or (c) component of the composition not only promotes the extensibility since it contains an alkyl chain of at least 3 carbon length but is also polymerizable into the coating composition since its other chain is of the vinyl type.

In addition the unusual attribute of strong adhesion of an extensible surface coating is due to the incorporation in the coating of the particular organic acids which have been discovered to enhance this property.

The following table lists the results obtained when dispersions, prepared as disclosed above, and containing the indicated acids were spread on film treated by a corona discharge also as disclosed above.

Table I

| Acid | Parts per hundred parts of polymer | Remarks |
|---|---|---|
| Itaconic | 2 | Spreads on treated film. |
| Mesaconic | 2 | Do. |
| Do | 10 | Spreads on treated film, but requires extra catalyst for polymerization. |
| Acrylic | 2 | Spreads on treated film. |
| Methacrylic | 2 | Do. |
| Citraconic | 2 | Poor spreading on treated film. |
| Aconitic | 2 | Do. |
| Sorbic | 2 | Very slow polymerization. |
| Cinnamic | 2 | Do. |
| Maleic | 2 | Do. |
| Fumaric | 2 | Do. |

In addition where maximum adhesion of coating to base sheet is sought, the proportions of the extensible polymer and plasticizing material may be changed as this has been found to influence the adhesion of the coating. Data indicating this influence is included in Table II.

Table II

|  | Percent composition ||||| 
|---|---|---|---|---|---|
| Vinylidene chloride | 83 | 83 | 83 | 88 | 88 |
| n-butyl acrylate | 15 | 15 | 15 | 10 | 10 |
| Itaconic acid | 2 |  |  |  |  |
| Mesaconic acid |  | 2 |  |  |  |
| Acrylic acid |  |  | 2 | 2 |  |
| Methacrylic acid |  |  |  |  | 2 |
| Heat seal strength, g | 346 | 221 | 729 | 894 | 800 |

As is also evident from this table, a change in the degree of adhesion of the coating results from a change in the acid anchoring agent which is employed.

Variation in the amount of butylacrylate permits control of polymer hardness and, to a certain extent, the coated film to coated film coefficient of friction. The range from 7 to 15 parts yields coatings which do not flake from polyethylene on stretching. Proportions of butylacrylate below seven parts and the use of other acrylates in its place offer other opportunities to improve polymer properties. Such alternative plasticizers may include for example di (2-ethyl hexyl) maleate, dibutyl maleate, diethyl fumarate, ethyl acrylate, tributyl aconitate, cyclohexyl acrylate and 2-ethylhexyl acrylate. The following table lists some of the results which have been obtained.

Table III

| 7 parts of monomer | Heat seal strength, gms. | Slip | Blocking | Appearance | Stretch |
|---|---|---|---|---|---|
| Butyl acrylate | 495 | Good | None | Clear | Good. |
| Cyclohexyl acrylate | 439 | Poor |  | do | Do. |
| 2 ethylhexyl acrylate | 35 | Good | None | do | Fair. |
| Ethyl acrylate | 1,002 | Poor | Moderate | do | Good. |
| Vinyl 2-ethyl-hexanoate | 55 | Fair | None | do | Fair. |
| Vinyl stearate | 335 | Good | do | do | Good. |
| Diethyl fumarate | 0 | Fair | do | Sl. cloudy | Fair. |

Among the base films which may be coated with the coating composition disclosed above, films of polyethylene, polypropylene or combination of these may be employed. In many cases, the adhesion of the coating composition to the base sheet may require a pretreatment of the base films such as the treatment of polyethylene film discussed above.

It is also conceivable to use the film as coated above as one part of a laminated film produced therefrom. The coating of the coated extensible film could act as the adhesive layer when the film is laminated with other films such as those of cellulose, polyethylene, polyvinylidene chloride and the like.

Obviously, the wetting agent, the catalyst and the dispersion medium disclosed in the examples and discussion above can be replaced by others without departing from the spirit and scope of this invention.

One may also incorporate into the coating compositions various delustrants, coloring matters, fillers, slip agents, plasticizers, etc., all of which may be for the purpose of improving the quality of the film.

The foregoing is a continuation-in-part of the application Serial No. 483,174 filed January 20, 1955, and now abandoned.

Since many examples of the foregoing procedures and articles may be carried out and made, and since many modifications can be made in the procedures and articles described without departing from the scope of the subject invention, the foregoing is to be interpreted as illustrative only, and not as defining or limiting the scope of the invention.

We claim:

1. A coated extensible film comprising an extensible polymeric base sheet coated with a single layer of a copolymer of about 80 to about 95 parts of vinylidene chloride, with about 1 to about 3 parts of an acid selected from the group consisting of acrylic acid and methacrylic acid and with about 5 to about 20 parts of an ester of the group consisting of $CH_2=CH—COOR$ and $R—COO—CH=CH_2$ where R is an alkyl group containing 4 to 20 carbon atoms.

2. A coated polyethylene film comprising a polyethylene base sheet treated to promote adhesion of a coating thereon and coated with a single layer of a copolymer of about 83 parts vinylidene chloride, about 2 parts methacrylic acid and about 15 parts of butyl acrylate.

3. A coated polyethylene film comprising a polyethylene base sheet treated to promote adhesion of a coating thereon and coated with a single layer of a copolymer of about 83 parts vinylidene chloride, about 2 parts of methacrylic acid and about 15 parts of vinyl 2-ethylhexanoate.

4. A coated polyethylene film comprising a polyethylene base sheet treated to promote adhesion of a coating thereon and coated with a single layer of a copolymer of about 83 parts of vinylidene chloride, about 2 parts methacrylic acid and about 15 parts of 2-ethylhexyl acrylate.

5. An extensible coated polyolefine film having a single layer of adherent polymeric coating thereon, said layer consisting essentially of about 80 to 95 parts of vinylidene chloride copolymerized with about 1 to 3 parts of an acid selected from the group consisting of acrylic and methacrylic acids and with about 5 to 20 parts of butyl acrylate.

6. A coating process for polyethylene film comprising coating it with a latex of a polymeric composition comprising from about 80 to about 95 parts vinylidene chloride, from about 1 to about 3 parts acrylic acid and from about 5 to 20 parts of an ester of the group consisting of $CH_2=CH—COOR$ and $R—COO—CH=CH_2$ where R is an alkyl group containing 4 to 20 carbon atoms, and drying said coating.

7. A coating process for polyethylene film comprising emulsifying a polymer of about 83 parts of vinylidene chloride, about 2 parts methacrylic acid and about 15 parts of butyl acrylate in water, coating polyethylene film with the resulting dispersion, and thereafter heating said film to dry the coating.

8. A method of forming an adherent coating on the surface of a polyethylene article which comprises forming an aqueous dispersion of a polymeric composition consisting essentially of 80 to 95 parts of vinylidene chloride copolymerized with about 1 to 3 parts of an acid selected from the group consisting of acrylic acid and methacrylic acid and with about 5 to about 20 parts of an ester of the group consisting of $CH_2=CH \cdot COO \cdot R$ and $R \cdot COO \cdot CH=CH_2$ where R is an alkyl group containing 4 to 20 carbon atoms, applying said dispersion to said surface, and drying said coating thereon.

References Cited in the file of this patent

UNITED STATES PATENTS

| | | |
|---|---|---|
| 2,570,478 | Pitzl | Oct. 9, 1951 |
| 2,698,235 | Swindells | Dec. 28, 1956 |
| 2,748,027 | Meier | May 29, 1956 |
| 2,762,720 | Michel | Sept. 11, 1956 |
| 2,829,069 | Michel | Apr. 1, 1958 |
| 2,859,480 | Berthold et al. | Nov. 11, 1958 |
| 2,876,358 | Root | Mar. 3, 1959 |

FOREIGN PATENTS

| | | |
|---|---|---|
| 510,068 | Belgium | Apr. 15, 1952 |